United States Patent Office 2,916,508
Patented Dec. 8, 1959

2,916,508

METHOD OF PREPARATION OF 2,2-DIMETHYL-1,3-PROPANEDIOL CYCLIC HYDROGEN PHOSPHITE

Richard L. McConnell, Kingsport, Tenn., assignor to Eastman Kodak Company, Rochester, N.Y., a corporation of New Jersey No Drawing. Application October 1, 1956
Serial No. 612,984

5 Claims. (Cl. 260—461)

This invention relates to a novel process for the preparation of cyclic hydrogen phosphites. In a preferred embodiment it relates to the preparation of 2,2-dimethyl-1,3-propanediol cyclic hydrogen phosphite.

The value and growing importance of organophosphorus compounds has been established in many fields of activity. This valuable group of compounds has found employment as insecticides, stabilizers for polyesters and artifical resins, as fungicides, insecticides and other related uses. Therefore, it is of considerable importance to the art to have a method of producing organophosphorus compounds which is advantageous not only in its advance over prior art methods, but also in its adaptation to commercial production. Consequently, it is an object of this invention to provide a new and valuable process for the production of organophosphorus compounds, to provide a process which is readily adaptable to commercial exploitation, to provide a new and useful method of producing cyclic hydrogen phosphites and to provide a new and useful method of producing 2,2-dimethyl-1,3-propanediol cyclic hydrogen phosphite. These and other objects will be apparent from the description and claims that follow.

I have found that 2,2-dimethyl-1,3-propanediol and phosphorus trichloride can be reacted together in the presence of an aliphatic alcohol containing from 1 to 8 carbon atoms to prepare 2,2-dimethyl-1,3-propanediol cyclic hydrogen phosphite. I prefer to employ said reactants in approximately equimolar quantities. In a preferred aspect, the reaction is effected by adding phosphorus trichloride dropwise with stirring to a cooled mixture of glycol and alcohol. Also, after the initial vigorous reaction has subsided, it is preferable to blow the reaction mixture with an inert gas such as nitrogen or carbon dioxide to remove the liberated hydrogen chloride and alkyl chloride by-products. Although solvents are not required in the practice of my invention, inert solvents can be used; such inert solvents include the normally liquid hydrocarbons such as pentane, heptane, benzene, toluene and the like, chlorinated hydrocarbons and ethers. While the process of my invention may be carried out within the 0° to 100° C. range, I prefer to carry it out within the 25° to 100° C. range. Moreover, during the early stages of the reaction, it is desirable to maintain the reaction mixtures within the 25° to 75° C. range, since the reactions are explosive at temperatures above 100° C., especially when lower alcohols such as methyl, ethyl, propyl, or butyl alcohols are used.

As has been pointed out above, aliphatic alcohols containing from 1 to 8 carbon atoms are used in my invention. Those which can be used include methyl alcohol, ethyl alcohol, n-propyl alcohol, isopropyl alcohol, n-butyl alcohol, isobutyl alcohol, n-amyl alcohol, 4-methyl butyl alcohol, n-hexyl alcohol, 3,3-dimethylbutyl alcohol, 2-methylpentyl alcohol, 3-methylpentyl alcohol, n-heptyl alcohol, 2-methylhexyl alcohol, 5-methylhexyl alcohol, n-octyl alcohol, 2-ethylhexyl alcohol, and 2-ethyl-4-methylpentyl alcohol. While runs were attempted using alcohols above octyl, they were not successful and were not found to be within the practice of my invention.

The process of this invention may be illustrated by the following equation:

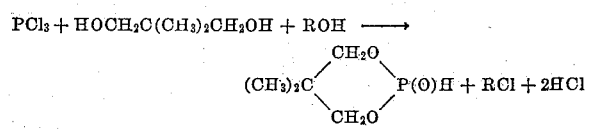

While the product of this invention is extremely useful in that it will undergo certain known reactions of dialkyl hydrogen phosphites to produce compounds of established utility and is quite useful as an intermediate for the preparation of other organophosphorus compounds, it is extremely valuable in that, contrary to the usual sensitivity to ring opening of cyclic hydrogen phosphites, this particular cyclic hydrogen phosphite is remarkably stable.

In accordance with the above, the following examples are offered as illustrative of certain preferred embodiments of my invention:

Example 1

Ethyl alcohol (0.3 mole), and 2,2-dimethyl-1,3-propanediol (0.3 mole) were mixed in a round-bottom flask fitted with a stirrer, dropping funnel, thermometer, and condenser. While the reaction flask was cooled in an ice bath, phosphorus trichloride (0.3 mole) was added dropwise with stirring so that the temperature did not rise above 25° C. After all the phosphorus trichloride had been added and the exothermic reaction had subsided, the reaction mixture was stirred at 25° C. with nitrogen blowing through to remove the liberated hydrogen chloride and ethyl chloride. Finally, the reaction mixture was warmed on the steam bath to complete the removal of the by-products. The evolved ethyl chloride was collected in a Dry-Ice trap. After a forerun, 62% yield of product distilled at 142–145° C. at 2.9 mm. This distillate solidified to a white crystalline solid which melted at 48–50° C. The infrared curve obtained on this material shows a strong P-H absorption band. Molecular weight as determined by treatment of sample with excess alkali followed by back titration with acid was 153.7 (calculated molecular weight=150.12).

Example 2

The reaction of methyl alcohol (0.3 mole), 2,2-dimethyl-1,3-propanediol (0.3 mole), and phosphorus trichloride (0.3 mole) was effected according to the procedure of Example 1 and a 63% yield of 2,2-dimethyl-1,3-propanediol cyclic hydrogen phosphite was obtained.

Example 3

Isobutyl alcohol (0.3 mole) and 2,2-dimethyl-1,3-propanediol (0.3 mole) were mixed, stirred, and treated with $PCl_3$ (0.3 mole) dropwise. HCl was evolved immediately, and the temperature of the reaction mixture rose rapidly to 70° C. At this point isobutyl chloride started distilling from the reaction mixture at a head temperature of 68° C. ($n_D^{20}$ 1.3984). The reaction temperature was moderated by the rate of addition of the $PCl_3$, and the maximum temperature allowed during this stage of the reaction was 70° C. About 30 minutes were required to add the $PCl_3$. After the reaction temperature had dropped to 40° C., the reaction mixture was heated on the steam bath with stirring for 4 hours. During the last 2 hours of the reaction, nitrogen was blown through the reaction mixture to remove any HCl or isobutyl chloride left in the product. Finally the product was purified by distillation at reduced pressure, B.P. 117–119°

(1.3 mm.), M.P. 48–50° C. The yield was 30.8 g. (68.5%). The molecular weight as obtained by the titration method described in Example 1 was 152.9 (theory=150.12).

*Example 4*

2-ethylhexyl alcohol (0.3 mole), 2,2-dimethyl-1,3-propanediol (0.3 mole), and $PCl_3$ (0.3 mole) were reacted by the procedure given above for isobutyl alcohol. Fractionation of the reaction mixture gave the following fractions:

(1) 30–35° (1.1 mm.), $n_D^{20}$ 1.4330
(2) 35–74 (1.0 mm.), $n_D^{20}$ 1.4340
(3) 117–120 (0.8 mm.), M.P. 48–50° C.
(4) Residue, light colored oil which crystallized slowly on standing.

Fractions 1 and 2 are 2-ethylhexyl chloride. Fraction 3 is the product 2,2-dimethyl-1,3-propanediol cyclic hydrogen phosphite and represents a 75% yield. The residue also probably contains some product.

Thus, the foregoing illustrates to one skilled in the art that my process introduces a new and valuable means by which useful compounds may be produced both as specifically illustrated in the particular embodiments shown above, and in those others which are within the scope and spirit of the invention as described hereinabove and as defined in the appended claims.

I claim:

1. The process which comprises reacting in substantially equal molar proportions 2,2-dimethyl-1,3-propanediol, phosphorus trichloride and a saturated aliphatic alcohol containing 1–8 carbon atoms at a temperature of 0–100° C. to produce 2,2-dimethyl-1,3-propanediol cyclic hydrogen phosphite.

2. The process which comprises reacting in substantially equal molar proportions 2,2-dimethyl-1,3-propanediol, phosphorus trichloride and ethyl alcohol at a temperature of 0° to 100° C. to produce 2,2-dimethyl-1,3-propanediol cyclic hydrogen phosphite.

3. The process which comprises reacting in substantially equal molar proportions 2,2-dimethyl-1,3-propanediol, phosphorus trichloride and methyl alcohol at a temperature of 0° to 100° C. to produce 2,2-dimethyl-1,3-propanediol cyclic hydrogen phosphite.

4. The process which comprises reacting in substantially equal molar proportions 2,2-dimethyl-1,3-propanediol, phosphorus trichloride and isobutyl alcohol at a temperature of 0° to 100° C. to produce 2,2-dimethyl-1,3-propanediol cyclic hydrogen phosphite.

5. The process which comprises reacting in substantially equal molar proportions 2,2-dimethyl-1,3-propanediol, phosphorus trichloride and 2-ethylhexyl alcohol at a temperature of 0° to 100° C. to produce 2,2-dimethyl-1,3-propanediol cyclic hydrogen phosphite.

References Cited in the file of this patent

UNITED STATES PATENTS

| | | |
|---|---|---|
| 2,506,344 | Cleary | May 2, 1950 |
| 2,744,128 | Morris et al. | May 1, 1956 |

OTHER REFERENCES

Kosolapoff: Organo Phosphorus Compounds (1950 ed.), p 182, John Wiley & Sons, Inc., New York.

Lucas et al.: "J. Am. Chem. Soc.," vol. 72 (1950), p. 5492.

Anshutz et al.: "Chem. Abst.," vol. 45 (1950), col. 1531.